Figure 1:
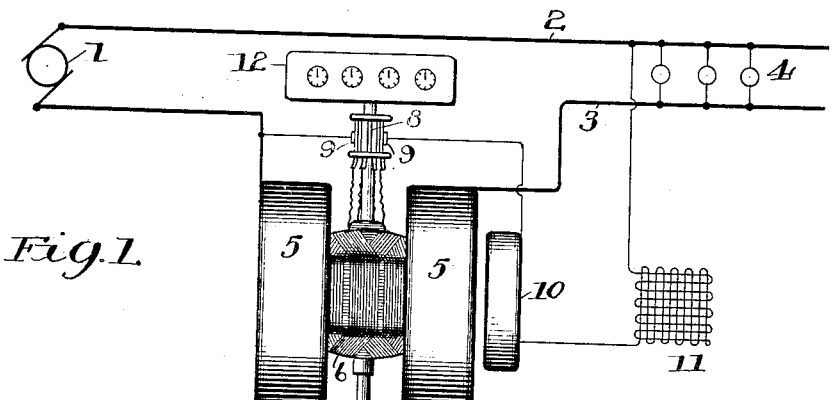

No. 817,305. PATENTED APR. 10, 1906.
T. DUNCAN.
ELECTRIC METER.
APPLICATION FILED JUNE 6, 1904.

Witnesses:
C. H. Crawford
Leon Stroh

Inventor
Thomas Duncan
by G. L. Cragg
his Attorney

200~# UNITED STATES PATENT OFFICE.

THOMAS DUNCAN, OF LA FAYETTE, INDIANA.

ELECTRIC METER.

No. 817,305. Specification of Letters Patent. Patented April 10, 1906.

Application filed June 6, 1904. Serial No. 211,246.

*To all whom it may concern:*

Be it known that I, THOMAS DUNCAN, a citizen of the United States, residing at La Fayette, in the county of Tippecanoe and State of Indiana, have invented a certain new and useful Improvement in Electric Meters, of which the following is a full, clear, concise, and exact description, reference being had to the accompanying drawings, forming a part of this specification.

My invention relates to electric meters employing motor elements that actuate damping-disks or their equivalents within magnetic fields, whereby the rate of operation of a meter may be suitably retarded. The invention is of service in connection with any form of meter employing such a damping arrangement and is shown herein in connection with commutated or direct-current meters, and has for its object the provision of means for maintaining the strength of the permanent magnets that are generally employed to furnish the magnetic fields within which said damping-disks rotate.

Ever since the introduction of motor-meters for the measurement of electrical energy said meters have been heir to considerable trouble arising from the character of the damping-magnets used, as these damping-magnets would be likely to vary in strength and become weaker. This weakening in strength causes the meters to increase in speed or run faster, in this way rendering the meters inaccurate and necessitating recalibration to resecure accuracy. This weakening is largely due to the aging of the magnets, as in the process of time sufficient lines of force are likely to become dissipated or diverted from the main magnetic circuit furnished by the permanent magnet. In accordance with my invention means are provided for preventing the diversion of lines of force. In accomplishing this result I provide the permanent magnets with subpoles or polar supplements, one such subpole or supplement being preferably provided for each permanent magnet-pole. These additions to the permanent magnets are preferably of soft iron and are desirably mechanically fixedly united with the permanent magnets. The polar supplements preferably extend beyond the poles proper and serve to direct lines of force that might otherwise leak back to their main path. These polar supplements or subpoles are preferably provided upon and are desirably integrally formed with respect to straps or bodies of soft iron that are desirably substantially continuous and within which are contained the permanent magnets, whereby paths are defined for leakage, which paths are thus substantially parallel with the paths defined by the permanent magnets. The subpoles or polar supplements and the straps or bodies of iron in association with the permanent magnets may assume a variety of forms, as will be readily understood to those skilled in the art.

In the accompanying drawings, I have illustrated several embodiments of the invention, in which—

Figure 2:
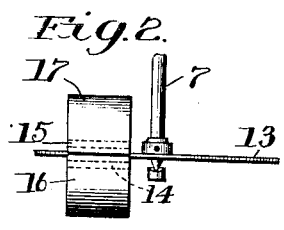
Figure 7:
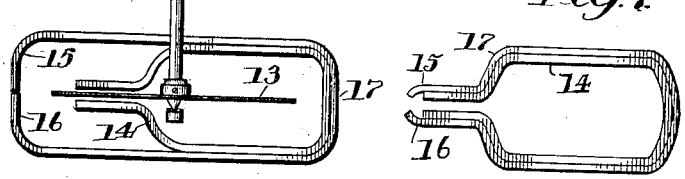
Figure 3:
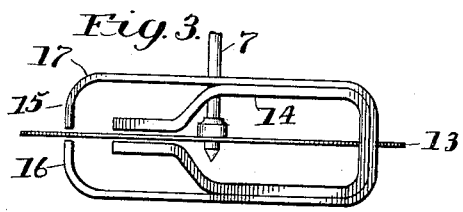
Figures 4, 5:
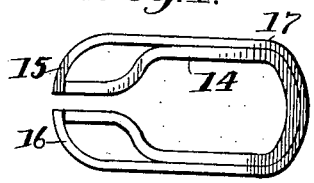
Figure 6:
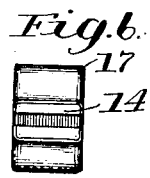
Figure 8:
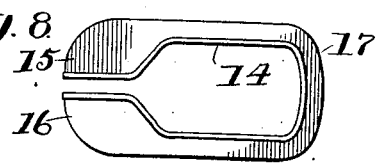

Figure 1 is a diagrammatic representation of a meter having damping mechanism as constructed in accordance with the preferred embodiment of the invention. Fig. 2 is a view in direction of arrow *a* of Fig. 1. Fig. 3 is a side view of a modification of the structure shown in Figs. 1 and 2. Fig. 4 is a side elevation of another modification of the invention. Figs. 5 and 6 are respectively front and side elevations of still another modification of the invention. Figs. 7 and 8 are side elevations of other modifications of the invention.

Like parts are indicated by similar characters of reference throughout the different figures.

Fig. 1 illustrates one kind of circuit with which one form of meter containing my invention may be employed. In this figure there is indicated a source of direct current 1, supplying current over transmission-lines 2 and 3 to translating means, such as lamps 4. The meter has a current field-winding subdivided into coils 5 5, between which the coils 6 upon a rotating spindle 7 are disposed. The coils 6 terminate in the segments of a commutator 8, upon which rests commutator-brushes 9 9, that serve to include the coils 6 in bridge of the transmission-mains, whereby rotation proportional to the watts or energy is secured. The commutator-brushes 9 are included in circuit with a torque-coil 10 and an artificial extraneous resistance 11. The shaft or spindle 7 operates a counting-train 12. Upon a portion of each meter-spindle 7 there is provided a damping-disk 13, that rotates between the poles of a permanent magnet 14 to secure the required reduction in the speed of the meter. Hitherto lines of force have become dissipated at the poles of the permanent magnet, to prevent which result I have associated with these poles polar supplements or subpoles 15 16, that are preferably of soft iron and which preferably extend beyond the poles of the permanent magnet, so as to intercept lines of force that spread from the poles of the permanent magnet and act as a guide for said lines of force back to the main magnetic circuit of the damping-magnet structure. These poles 15 and 16 are preferably integral parts of the strap 17, that surrounds and incloses the permanent magnet, the construction shown in Fig. 1 being preferred where the poles 15 and 16 are closely approached. Fig. 3 shows another form of the invention.

In Fig. 4 the subpoles 15 and 16 are brought somewhat close to the poles of the permanent magnet, as is somewhat the case in the construction illustrated in Fig. 7. In each construction illustrated in Figs. 1 to 7, inclusive, the front edges of the poles of the permanent magnets are illustrated as facing the subpoles 15 and 16, though this arrangement is not necessarily to be followed, because the construction illustrated in Fig. 8 is highly serviceable. The inclosure 17 is desirably of soft iron, preferably in sheet form, though in Fig. 8 I have illustrated a construction wherein the element 17 may be of cast-iron. The reluctance in the magnetic circuit furnished by the elements 15, 16, and 17 should be so determined as to prevent such a short-circuiting of the permanent magnets as to prevent the damping-disks from being subject to a proper amount of flux. This reluctance may be determined in a variety of ways known to those skilled in the art. The elements 17 are desirably in contact with the permanent magnets and preferably form component parts of the damping-magnet structure, they acting as secondary conductors to lines of force leading from the permanent magnet.

It is obvious that changes may be made in the various constructions shown without departing from the spirit of my invention, and I do not, therefore, wish to be limited to the precise constructions illustrated; but,

Having thus described my invention, I claim as new and desire to secure by Letters Patent—

1. An electric meter having a damping-disk upon its spindle and a damping-magnet in whose field the disk rotates, said damping-magnet including a permanent magnet, and a substantially continuous band of soft iron defining a path for lines of force and within which the permanent magnet is contained, substantially as described.

2. An electric meter having a damping-disk upon its spindle and a damping-magnet in whose field the disk rotates, said damping-magnet including a permanent magnet, and a substantially continuous band defining a path for lines of force and within which the permanent magnet is contained, substantially as described.

3. An electric meter having a damping-disk upon its spindle and a damping-magnet in whose field the disk rotates, said damping-magnet comprising a permanent magnet, and an inclosing iron element establishing a portion of the main flux-circuit parallel to the portion of the main flux-circuit established by the permanent magnet, substantially as described.

4. An electric meter having a damping-disk upon its spindle and a damping-magnet in whose field the disk rotates, said damping-magnet comprising a permanent magnet, and an iron element establishing a portion of the main flux-circuit parallel to the portion of the main flux-circuit established by the permanent magnet, substantially as described.

5. An electric meter having a damping-disk upon its spindle and a damping-magnet in whose field the disk rotates, said damping-magnet comprising a permanent magnet, and an inclosing element of magnetic material establishing a portion of the main flux-circuit parallel to the portion of the main flux-circuit established by the permanent magnet, substantially as described.

6. An electric meter having a damping-disk upon its spindle and a damping-magnet in whose field the disk rotates, said damping-magnet comprising a permanent magnet, and an element of magnetic material establishing a portion of the main flux-circuit parallel to the portion of the main flux-circuit established by the permanent magnet, substantially as described.

7. An electric meter having a damping-disk upon its spindle and a damping-magnet in whose field the disk rotates, said damping-magnet comprising a permanent magnet, and an inclosing element establishing a portion of the main flux-circuit parallel to the portion of the main flux-circuit established by the permanent magnet, substantially as described.

8. An electric meter having a damping-disk upon its spindle and a damping-magnet in whose field the disk rotates, said damping-magnet comprising a permanent magnet, and an element establishing a portion of the main flux-circuit parallel to the portion of the main flux-circuit established by the permanent magnet, substantially as described.

9. An electric meter having a damping-disk upon its spindle and a damping-magnet in whose field the disk rotates, said damping-magnet comprising a permanent magnet, and an inclosing iron element serving to direct and confine leakage lines of force due to the permanent magnet to the main flux-circuit, substantially as described.

10. An electric meter having a damping-disk upon its spindle and a damping-magnet in whose field the disk rotates, said damping-magnet comprising a permanent magnet, and an iron element serving to direct and confine leakage lines of force due to the permanent magnet to the main flux-circuit, substantially as described.

11. An electric meter having a damping-disk upon its spindle and a damping-magnet in whose field the disk rotates, said damping-magnet comprising a permanent magnet, and an inclosing element of magnetic material serving to direct and confine leakage lines of force due to the permanent magnet to the main flux-circuit, substantially as described.

12. An electric meter having a damping-disk upon its spindle and a damping-magnet in whose field the disk rotates, said damping-magnet comprising a permanent magnet, and an element of magnetic material serving to direct and confine leakage lines of force due to the permanent magnet to the main flux-circuit, substantially as described.

13. An electric meter having a damping-disk upon its spindle and a damping-magnet in whose field the disk rotates, said damping-magnet comprising a permanent magnet, and an inclosing element serving to direct and confine leakage lines of force due to the permanent magnet to the main flux-circuit, substantially as described.

14. An electric meter having a damping-disk upon its spindle and a damping-magnet in whose field the disk rotates, said damping-magnet comprising a permanent magnet, and an element serving to direct and confine leakage lines of force due to the permanent magnet to the main flux-circuit, substantially as described.

15. An electric meter having a damping-disk upon its spindle and a damping-magnet in whose field the disk rotates, said damping-magnet comprising a permanent magnet, and an inclosing soft-iron element serving to direct and confine leakage lines of force due to the permanent magnet to the main flux-circuit, substantially as described.

16. An electric meter having a damping-disk upon its spindle and a damping-magnet in whose field the disk rotates, said damping-magnet comprising a permanent magnet, and a soft-iron element serving to direct and confine leakage lines of force due to the permanent magnet to the main flux-circuit, substantially as described.

17. An electric meter having a damping-disk upon its spindle and a damping-magnet in whose field the disk rotates, said damping-magnet comprising a permanent magnet, and an inclosing soft-iron element establishing a portion of the main flux-circuit parallel to the portion of the main flux-circuit established by the permanent magnet, substantially as described.

18. An electric meter having a damping-disk upon its spindle and a damping-magnet in whose field the disk rotates, said damping-magnet comprising a permanent magnet, and a soft-iron element substantially coextensive with the permanent magnet and establishing a portion of the main flux-circuit parallel to the portion of the main flux-circuit established by the permanent magnet, substantially as described.

19. A permanent magnet having an inclosing soft-iron element serving to direct and confine leakage lines of force due to the permanent magnet to the main flux-circuit, substantially as described.

20. A permanent magnet in combination with a substantially continuous band of soft iron defining a path for lines of force and within which the permanent magnet is contained, substantially as described.

21. A permanent magnet having an inclosing soft-iron element establishing a portion of the main flux-circuit parallel to the portion of the main flux-circuit established by the permanent magnet, substantially as described.

22. A permanent magnet associated with a soft-iron element that is substantially coextensive therewith, substantially as described.

In witness whereof I hereunto subscribe my name this 3d day of June, A. D. 1904.

THOMAS DUNCAN.

Witnesses:
JOHN E. DALTON,
JOHN R. PFROMMER.